US005754039A

United States Patent [19]

Nishimura

[11] Patent Number: 5,754,039

[45] Date of Patent: May 19, 1998

[54] VOLTAGE-TO-CURRENT CONVERTER USING CURRENT MIRROR CIRCUITS

[75] Inventor: Kouichi Nishimura, Tokyo, Japan

[73] Assignee: NEC Corporation, Tokyo, Japan

[21] Appl. No.: 619,317

[22] Filed: Mar. 21, 1996

[30] Foreign Application Priority Data

Mar. 24, 1995 [JP] Japan .................................... 7-065580

[51] Int. Cl.$^6$ .................................................... H02M 3/335

[52] U.S. Cl. .............................................. 323/315; 363/73

[58] Field of Search .................................... 323/315, 313; 363/73

[56] References Cited

U.S. PATENT DOCUMENTS 4,591,739 5/1986 Nagano .................................. 307/297
5,451,859 9/1995 Ryat ........................................ 323/312

FOREIGN PATENT DOCUMENTS

WO 82/02805 8/1982 Germany ............................... 323/315
34020-068A1 12/1984 Germany ............................... 323/315
5-259755 of 0000 Japan .

*Primary Examiner*—Peter S. Wong
*Assistant Examiner*—Rajnikant B. Patel
*Attorney, Agent, or Firm*—Laff, Whitesel, Conte & Saret, Ltd.

[57] ABSTRACT

A voltage-to-current converter includes first and second current mirror circuits, a bipolar transistor, a start-up transistor, and a resistor. The first current mirror circuit which generates a first current proportional to the second current received from the second current mirror circuit. The second current mirror circuit generates an output current and the second current each of which is proportional to a third current. The bipolar transistor receives the first current from the first current mirror circuit at a connecting point which connects the collector to the base of the bipolar transistor, and the emitter is connected to the input terminal. And the resistor connects the connecting point to the second current mirror circuit such that the third current is supplied to the second current mirror circuit.

30 Claims, 5 Drawing Sheets

VOLTAGE-TO-CURRENT CONVERTER USING CURRENT MIRROR CIRCUITS

BACKGROUND OF THE INVENTION

1. Field of the Invention

The present invention relates to a voltage-to-current conversion circuit and, more specifically, to a voltage-to-current conversion circuit for converting an input voltage to a current by using a current mirror circuit.

2. Description of the Related Art

There has been proposed a voltage-to-current conversion circuit which uses a plurality of current mirror circuits to enable operating with an input voltage that is higher than the ground potential and to reduce the error in voltage-to-current conversion (see Japanese Patent Application Laid-Open No. 5-259755, for instance).

FIG. 1 is a circuit diagram showing an example of this type of conventional voltage-to-current conversion circuit. The voltage-to-current conversion circuit is composed of a PNP transistor Q1 whose base is connected to an input terminal A, a start-up circuit ST, and current mirror circuits CM1–CM3. The current mirror circuit CM1 consists of NPN transistors Q2 and Q3 that supplies one terminal of a resistor R1 with a current equivalent to that flowing through the transistor Q1. The current mirror circuit CM2 consists of NPN transistors Q4 and Q5 that are connected to the other terminal of the resistor R1 and cause a current equivalent to that flowing through the resistor R1 to flow through an output terminal B. The current mirror circuit CM3 consists of PNP transistors Q6–Q8 that cause a current proportional to that flowing through the resistor R1 to flow through the transistor Q2. The start-up circuit ST consists of a PNP transistor Q9 and a resistor R.

An input voltage $V_{IN}$ is applied to the base of the PNP transistor Q1. The collector of the PNP transistor Q1 is grounded, and its emitter is connected to the emitter of the NPN transistor Q2 that constitutes the current mirror circuit CM1. The base of the transistor Q2 is connected to its collector as well as to the base of the NPN transistor Q3. The emitter of the transistor Q3 is connected, via the resistor R1, to the collector and base of the NPN transistor Q4 that constitutes the current mirror circuit CM2, and also connected to the base of the NPN transistor Q5. The emitters of the transistors Q4 and Q5 are grounded, and the collector of the transistor Q5 is connected to the output terminal B.

Connected to the collector of the transistor Q2 is the collector of the PNP transistor Q6 that constitutes the current mirror circuit CM3 as a current source. The base of the transistor Q6 is connected to the base of the PNP transistor Q7 as well as to the emitter of the PNP transistor Q8, whose collector is grounded. The base of the transistor Q8 is connected to the collectors of the PNP transistor Q7 and the NPN transistor Q3. The emitters of the transistors Q6 and Q7 are connected to a voltage source Vcc.

The collector of the PNP transistor Q9 that constitutes the start-up circuit ST is connected to the connecting point of the collector and base of the transistor Q2 and the collector of the transistor Q6. The base of the transistor Q9 is supplied with a reference voltage Vb, and its emitter is connected to the voltage source Vcc via the resistor R. The start-up circuit ST serves to cause a very small current to flow through the transistor Q1 when the current mirror circuit CM3 is off.

In the conventional voltage-to-current conversion circuit having the above circuit configuration, the current mirror circuit CM3, which consists of the transistors Q6–Q8 and serves as a current source, causes a current equivalent to that flowing through the transistor Q3 to flow through the transistor Q2. Therefore, the currents flowing through the transistors Q2 and Q3, which constitute the current mirror circuit CM1, are equal to each other, and a voltage across the resistor R1 is approximately equal to the input voltage $V_{IN}$. Further, currents flowing through the transistor Q3 and each of the transistors Q4 and Q5 are equal to one another, and a collector current $I_{OUT}$ of the transistor Q5 which flows through the output terminal B is expressed by the following equation (1).

$$I_{OUT}=(V_{IN}+V_{BE1}+V_{BE2}-V_{BE3}-V_{BE4})/R1 \quad (1)$$

where $V_{BE1}$, $V_{BE2}$, $V_{BE3}$ and $V_{BE4}$ are base-emitter voltages of the respective transistors Q1, Q2, Q3 and Q4, and R1 is a resistance of the resistor R1.

Since the currents flowing through the respective transistors Q1, Q2, Q3 and Q4 are equal to one another, a different between the base-emitter voltage $V_{BE1}$ of the PNP transistor Q1 and each of the base-emitter voltages $V_{BE2}$, $V_{BE3}$ and $V_{BE4}$ of the NPN transistors Q2, Q3 and Q4 is about 0.1 V. If the input voltage $V_{IN}$ so large that this voltage difference can be neglected, Equation (1) is simplified as $$I_{OUT}\approx V_{IN}/R1. \quad (2)$$

Thus, according to Equation (2), the output current $I_{OUT}$ flowing through the output terminal B is a current obtained by converting the input voltage $V_{IN}$ by means of the resistor R1.

As described above, in the conventional voltage-to-current conversion circuit, the base-emitter voltage $V_{BE1}$ of the PNP transistor Q1 is somewhat different from the base-emitter voltages $V_{BE2}$, $V_{BE3}$ and $V_{BE4}$ of the NPN transistors Q2, Q3 and Q4 even if their collector currents are the same. Further, the temperature characteristics of the transistor Q1 are a little different from those of the transistors Q2, Q3 and Q4. Therefore, actually Equation (1) is rewritten to Equation (3).

$$I_{OUT}=(V_{IN}+V_{BE(PNP)}-V_{BE(NPN)})/R1 \quad (3)$$

where $V_{BE(PNP)}$ and $V_{BE(NPN)}$ are the base-emitter voltages of the NPN and PNP transistors, respectively. Thus, the conventional voltage-to-current conversion circuit has a problem that the difference between the base-emitter voltage $V_{BE1}$ of the PNP transistor Q1 and the base-emitter voltages $V_{BE2}$, $V_{BE3}$ and $V_{BE4}$ of the NPN transistors Q2, Q3 and Q4 appears as an error component.

The conventional voltage-to-current conversion circuit has another problem that the convertible input voltage range is relatively narrow. That is, since the input voltage range is 0 V to Vcc–2$V_{BE}$ ($V_{BE}$: base-emitter voltage of the transistors Q2 and Q6), the maximum input voltage is about 3.5 V in cases where the voltage source Vcc has a voltage of 5 V. Further, the current flowing through the transistor Q9 of the start-up circuit ST is a factor of causing an error in the base-emitter voltage of the transistor Q2.

SUMMARY OF THE INVENTION

The present invention has been made in view of the above problems in the art and, therefore, has an object of providing a voltage-to-current conversion circuit which can perform highly accurate voltage-to-current conversion with a simple circuit configuration.

Another object of the invention is to provide a voltage-to-current conversion circuit which can widen the operational input voltage range.

A further object of the invention is to provide a voltage-to-current conversion circuit in which an influence of a start-up circuit on the conversion error is eliminated.

According to an aspect of the present invention, a voltage-to-current conversion circuit is composed of a first current mirror circuit, a second current mirror circuit, a bipolar transistor, and a resistor which are designed to cancel out the base-emitter voltages of bipolar transistors which would be factors of causing an error in converting the input voltage to the output current by means of the resistor.

The first current mirror circuit generates a first current which is proportional to the second current received from the second current mirror circuit. The second current mirror circuit generates the output current and the second current each of which is proportional to a third current. The bipolar transistor receives the first current from the first current mirror circuit at a connecting point which connects the collector to the base of the bipolar transistor. The emitter of the bipolar transistor is connected to the input terminal which receives the input voltage. And the resistor connects the connecting point of the bipolar transistor to the second current mirror circuit such that the third current is supplied to the second current mirror circuit. The bipolar transistor causes the first current to branch off the third current, and the third current causes a voltage equal to the input voltage to be generated across the resistor. Therefore, the voltage-to-current conversion can be performed with high accuracy with a simple circuit configuration.

Preferably, the voltage-to-current conversion circuit is provided with a start-up means. The start-up means is formed with a transistor for supplying an initial current to the first current mirror circuit. The base of the transistor is connected to the input terminal, the collector to the second terminal of the first current mirror circuit, and the emitter to the connecting point of the bipolar transistor. Since the start-up transistor can positively be cut off in the steady state, it is prevented from causing adverse effects on the accuracy of voltage-to-current conversion.

More specifically, the second current mirror circuit includes three transistors each base connected to each other. The base and collector of the first transistor are connected in common to the resistor, and the emitter is connected to the ground. The collector of the second transistor is connected to the first output terminal, and the emitter is connected to the ground. And the collector of the third transistor is connected to the second output terminal, and the emitter is connected to the ground.

Registers each having the same resistance are preferably connected to the respective emitters of the bipolar transistor and the first, second and third transistors, resulting in the increased output impedance of the voltage-to-current conversion circuit.

Further, the emitter of the bipolar transistor may be connected to the ground through a resistor or a fourth transistor whose collector is connected to the emitter of the bipolar transistor, base is connected to the base of the first transistor, and emitter is connected to the ground. This configuration enables the current flowing through the voltage input terminal to become zero, and thereby reduces the load at the voltage input terminal. This allows an input voltage source that is connected to the voltage input terminal to have weak driving ability.

Furthermore, according to the present invention, the maximum allowable input voltage (with respect to the reference potential) at the voltage input terminal is as high as a positive power source voltage minus the base-emitter voltage of one transistor in the first current mirror circuit. The input voltage range can be widened from the conventional voltage-to-current conversion circuit by the base-emitter voltage of one transistor.

DESCRIPTION OF THE PREFERRED EMBODIMENTS

FIRST EMBODIMENT

Figure 2:
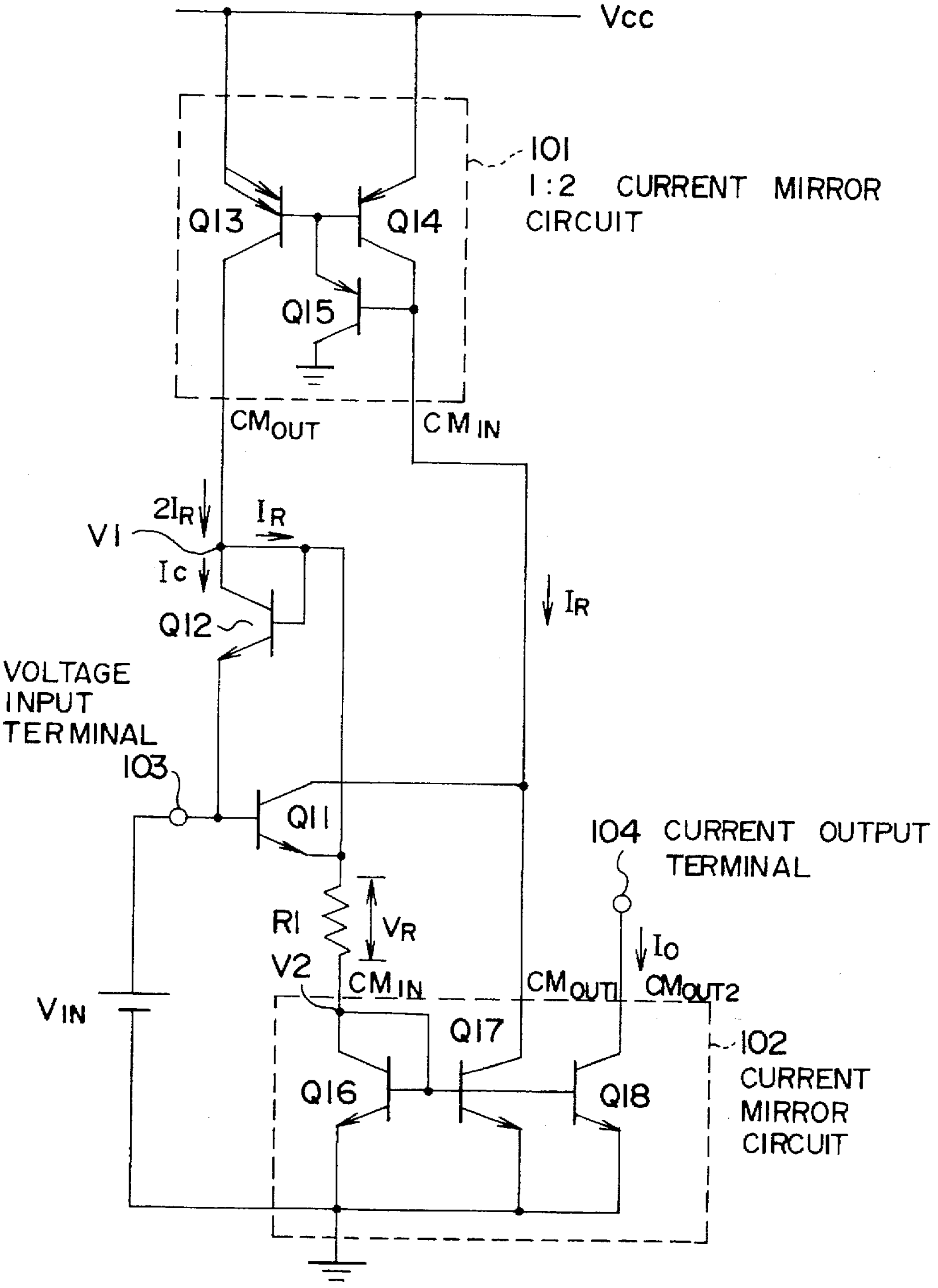
FIG. 2 is a circuit diagram showing a voltage-current conversion circuit according to a first embodiment of the present invention.

As shown in FIG. 2, the voltage-current conversion circuit according to the first embodiment is composed of a 1:2 current mirror circuit 101, a current mirror circuit 102, an NPN transistor Q11, an NPN transistor Q12, and a resistor R1. The voltage input terminal 103 of the voltage-current conversion circuit is connected to the base of the NPN transistor Q11 and the emitter of the NPN transistor Q12.

The output terminal $CM_{OUT}$ of the 1:2 current mirror circuit 101 is connected to the base and collector of the transistor Q12 and the emitter of the transistor Q11. One end of the resistor R1 is connected to the connecting point of the base and collector of the transistor Q12, the emitter of the transistor Q11, and further the output terminal $CM_{OUT}$ of the 1:2 current mirror circuit 101. The other end of the resistor R1 is connected to the input terminal $CM_{IN}$ of the current mirror circuit 102. The first output terminal $CM_{OUT1}$ of the current mirror circuit 102 is connected to the collector of the transistor Q11 as well as the input terminal $CM_{IN}$ of the 1:2 current mirror circuit 101. The second output terminal $CM_{OUT2}$ of the current mirror circuit 102 is connected to the current output terminal 104.

The 1:2 current mirror circuit 101 has the circuit configuration as an example which is composed of transistors Q13–Q15. It is a current mirror circuit in which the emitter areas of the transistors Q13 and Q14 are so set that the ratio of the input current flowing through the input terminal $CM_{IN}$ to the output current flowing through the input terminal $CM_{OUT}$ becomes 1:2. Thus, the emitter area of the transistor Q13 is two times that of the transistor Q14 so that the output current $2I_R$ that is two times the input current $I_R$ flowing through the input terminal $CM_{IN}$ is output from the collector of the transistor Q13 to the transistor Q12. The transistor Q12 is biased by this output current $2I_R$. Needless to say, the circuit configuration of the 1:2 current mirror circuit 101 is not limited to that as shown in this figure.

The current mirror circuit 102 is composes of NPN transistors Q16–Q18 and causes a current equivalent to that flowing through the resistor R1 to flow through the input terminal $CM_{IN}$ of the 1:2 current mirror circuit 101 and a current output terminal 104. The current mirror circuit 102 has two output terminals $CM_{OUT1}$ and $CM_{OUT2}$ which are connected to the collector of the NPN transistor Q17 and the collector of the NPN transistor Q18, respectively. The collector and base of the NPN transistor Q16, to which a current is input via the resistor R1, are connected to each other, and also connected to the bases of the transistors Q17 and Q18. The emitters of the transistors Q16–Q18 are connected together.

The output terminal $CM_{OUT1}$, or the collector of the transistor Q17, is connected to the input terminal $CM_{IN}$ of the 1:2 current mirror circuit 101. The collector of the transistor Q18, or the collector of the transistor Q18, is connected to the current output terminal 104 on which an output current corresponding to the input voltage $V_{IN}$ appears.

The NPN transistor Q11 is provided as a start-up circuit for the entire circuit. The collector of the transistor Q11 is connected to the input terminal $CM_{IN}$ of the 1:2 current mirror circuit 101, its base is connected to the voltage input terminal 103, and its emitter is connected to the input terminal $CM_{IN}$ of the current mirror circuit 102, that is, the collector and base of the NPN transistor Q16, through the resistor R1.

Next, the operation of this embodiment will be described. The transistor Q11 becomes active upon power-on, and a resulting collector current of the transistor Q11 serves as an input current of the 1:2 current mirror circuit 101. When the input voltage $V_{IN}$ is applied to the voltage input terminal 103 in a state that the transistor Q12 is biased, a voltage V1 appears at the collector and base (connected to each other) of the transistor Q12, as given below.

$$V1=V_{IN}+V_{BE(Q12)} \quad (4)$$

where $V_{BE(Q12)}$ is a base-emitter voltage of the transistor Q12. On the other hand, a voltage V2 at the input terminal $CM_{IN}$ of the current mirror circuit 102, which is a base-emitter voltage of the transistor Q16 whose base and collector are connected to each other and emitter is grounded, is given by $$V2=V_{BE(Q16)}. \quad (5)$$

Therefore, a voltage $V_R$ across the resistor R1 is $$V_R=V1-V2=V_{IN}+V_{BE(Q12)}V_{BE(Q16)}. \quad (6)$$

A current $I_R$ flowing through the resistor R1 is $$I_R32\ V_R/R1. \quad (7)$$

Since this current is input to the current mirror circuit 102, the collector currents of the respective transistors Q17 and Q18, which are output currents of the current mirror circuit 102, are equal to $I_R$.

Since the collector current of the transistor Q17 is supplied to the input terminal $CM_{IN}$ of the 1:2 current mirror circuit 101 having the input-to-output current ratio of 1:2, the output current of the 1:2 current mirror circuit CM4 becomes $2I_R$. If it is assumed that the common-emitter current amplification factor β of the transistor Q12 is sufficiently large, a collector current $I_{C(Q12)}$ is equal to the output current of the 1:2 current mirror circuit 101 minus the current flowing through the resistor R1, that is, given by Equation (8).

$$I_{C(Q12)}=2I_R-I_R=I_R \quad (8)$$

On the other hand, if it is assumed that the common-emitter current amplification factor β of the transistor Q16 is sufficiently large, a collector current $I_{C(Q16)}$ of the transistor Q16 is given by $$I_{C(Q16)}=I_R. \quad (9)$$

As is understood from Equations (8) and (9), the collector current $I_{C(Q12)}$ of the transistor Q12 is equal to the collector current $I_{C(Q16)}$ of the transistor Q16. As a result, Equation (10) holds between the base-emitter voltages $V_{BE(Q12)}$ and $V_{BE(Q16)}$ of the respective transistors Q12 and Q16.

$$V_{BE(Q12)}-VBE(Q16) \quad (10)$$

Substituting Equation (10) into Equation (6), we obtain $$V_R=V_{IN}. \quad (11)$$

Equation (11) means that the voltage across the resistor R1 is equal to the input voltage $V_{IN}$. As described above, the collector current of the transistor Q18 is equal to the current $I_R$, which is represented by Equation (7). By eliminating $V_R$ by substituting Equation (11) into Equation (7), an output current $I_O$ flowing through the output terminal 104 and the collector of the transistor Q18 is expressed as $$I_O=I_R=V_{IN}/R1. \quad (12)$$

Equation (12) means that the output current $I_O$ is a current obtained by accurately converting the input voltage $V_{IN}$ by means of the resistor R1 (voltage-to-current conversion).

The operation of the transistor Q11 (start-up circuit) will be described below. The transistor Q11 becomes active upon power-on. A collector current of the transistor Q11 flowing at this time is expressed as $$I_{C(Q11)}=(V_{IN}-V_{BE(Q11)}-V_{BE(Q16)})/R1. \quad (13)$$

The collector current $I_{C(Q11)}$ becomes an input current of the 1:2 current mirror circuit 101, so that the transistor Q12 is biased.

Figure 1:
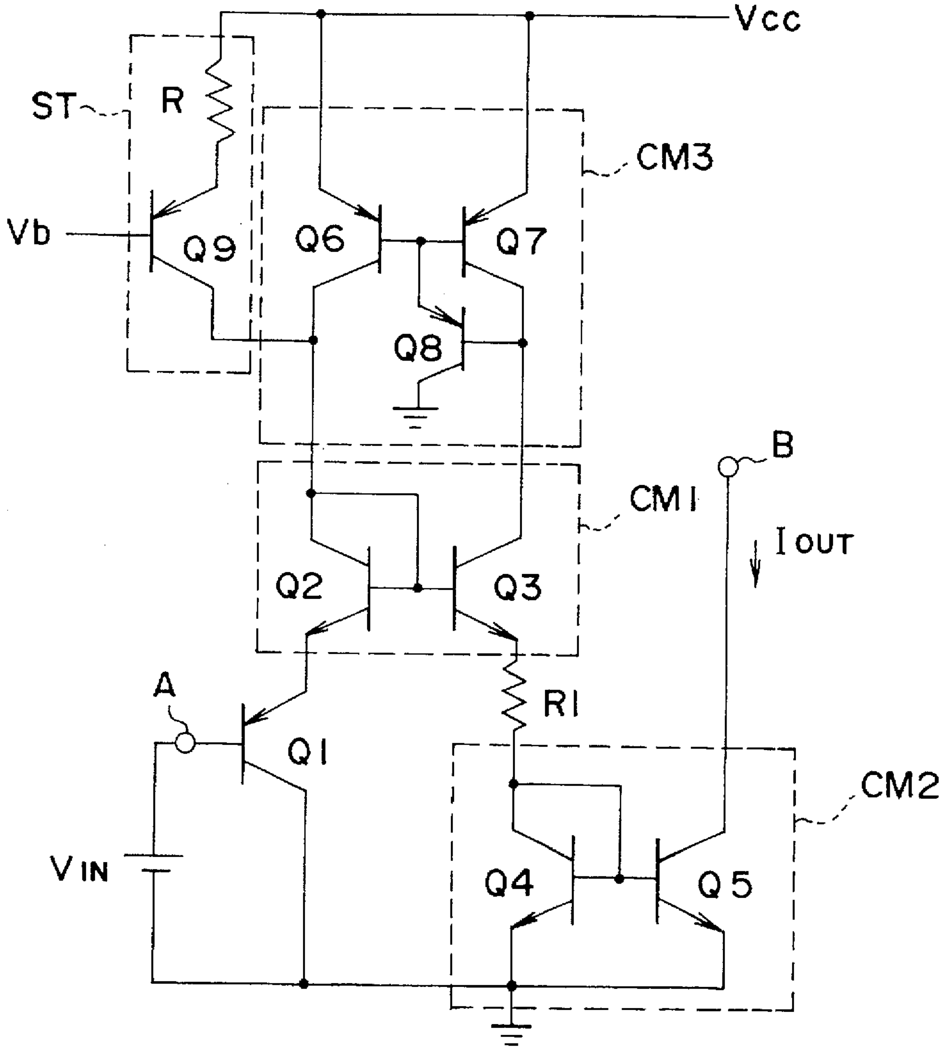
FIG. 1 PRIOR ART
FIG. 1 is a circuit diagram showing a conventional example.

As a result, the respective transistors have bias states as represented by Equations (4)–(12). An emitter voltage $V_{E(Q11)}$ of the transistor Q11 becomes equal to V1 of Equation (4), i.e., $V_{IN}+V_{BE(Q11)}$. The base-emitter junction of the transistor Q11 is reversely biased by $V_{BE(Q12)}$ (about 0.7 V), and hence the transistor Q5 is cut off. In this manner, the transistor Q11 operates only after the power-on, i.e., only during the start-up period; that is, it is cut off in the steady state. Thus, the transistor Q11 cause no adverse effects on the other part of the circuit. In this embodiment, in the case where the current mirror circuit 101 employs the configuration as shown in FIG. 2, the allowable range of the input voltage $V_{IN}$ is 0 V to Vcc–$V_{BE}$ where Vcc is a positive power supply voltage and $V_{BE}$ is a base-emitter voltage of an output-side transistor, that is, the transistor Q13, in the current mirror circuit 101, which range is wider than the corresponding range of the conventional circuit of FIG. 1 by $V_{BE}$ (about 0.7 V).

SECOND EMBODIMENT

Figure 3:
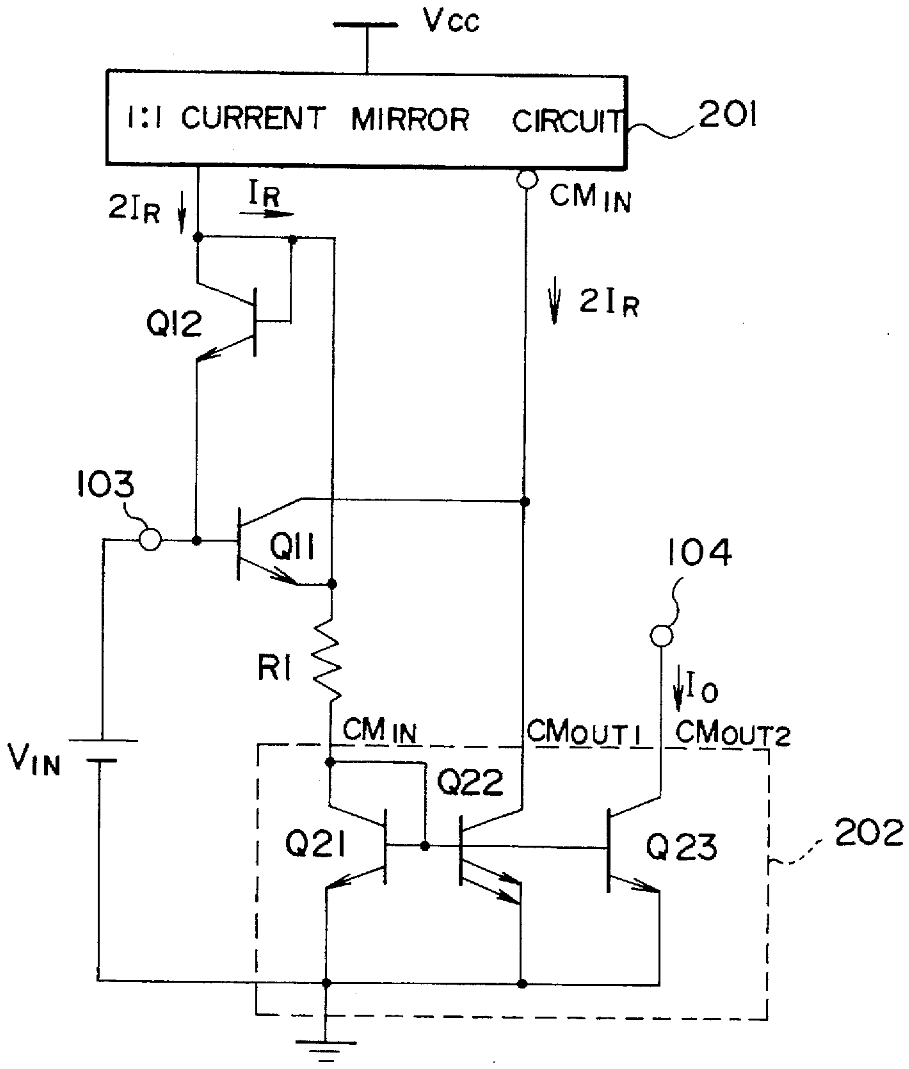
FIG. 3 is a circuit diagram showing a voltage-current conversion circuit according to a second embodiment of the invention.

As shown in FIG. 3, where the components that are the same as in FIG. 2 are given the same reference symbols and descriptions therefor will be omitted, this embodiment is composed of current mirror circuits 201 and 202 which are used in place of the current mirror circuits 101 and 102 of the first embodiment, respectively.

The current mirror circuit 201 is a current mirror circuit having an input-to-output current ratio of 1:1. The current mirror circuit 202 is composed of NPN transistors Q21, Q22 and Q23. The transistors Q21 and Q23 are the same as the transistors Q16 and Q18 of the first embodiment of FIG. 2. The transistor Q22 is used in place of the transistor Q17 of FIG. 2 so as to be connected to the other part of the circuit in the same manner as the transistor Q17 of FIG. 2. The emitter area of the transistor Q22 is twice that of the transistor Q21 or Q23. Therefore, a current ratio of $CM_{IN}$, $CM_{OUT1}$ and $CM_{OUT2}$ of the current mirror circuit 202 is 1:2:1. Therefore, a current flowing through the input terminal $CM_{IN}$ of the current mirror circuit 201 and the collector of the transistor Q22 is $2I_R$, which is twice the current represented by Equation (7).

Since an input-to-output current ratio of the current mirror circuit 201 is 1:1, its output current is equal to the input current, i.e., $2I_R$. Thus, this embodiment operates in the same manner as the first embodiment shown in FIG. 2, and hence has the same advantages as the latter.

THIRD EMBODIMENT

As shown in FIG. 3, where the components that are the same as in FIG. 2 are given the same reference symbols and descriptions therefor will be omitted, this embodiment is composed of a resistor R5 and a current mirror circuit 302. The resistor R5 is inserted between the emitter of the transistor Q12 and the connecting point of the voltage input terminal 103 and the base of the transistor Q11. The current mirror circuit 302 is used in place of the current mirror circuit 102 of the first embodiment. A 1:2 current mirror circuit 301 is the same as the 1:2 current mirror circuit 101 of the first embodiment. The current mirror circuit 302 is configured such that resistors R2, R3 and R4 are inserted between the ground and the emitters of the respective transistors Q31–Q33 that constitute the same current mirror circuit as in FIG. 2. The transistors 031–Q33 are connected to the other part of the circuit in the same manner as in the first embodiment.

In this embodiment, if the collector current of the transistor Q12 and the resistance of the resistor R5 are respectively written as $I_{C(Q12)}$ and R5, and if it is assumed that the common-emitter current amplification factor β of the transistor Q12 is sufficiently large, a voltage V1 at the connecting point of the base and collector of the transistor Q12 is expressed as $$V1 = V_{IN} + V_{BE(Q12)} + R5\, I_{C(Q12)}. \tag{14}$$

On the other hand, if the collector current of the transistor Q31 and the resistance of the resistor R2 are respectively written as $I_{C(Q31)}$ and R2, and if it is assumed that the common-emitter current amplification factor β of the transistor Q31 is sufficiently large, a voltage V2 at the connecting point of the base and collector of the transistor Q31, i.e., the input terminal $CM_{IN}$ of the current mirror circuit 302 is expressed as $$V2 = V_{BE(Q31)} + R2\, I_{C(Q31)}. \tag{15}$$

Since a voltage $V_R$ across the resistor R1 is a difference between the voltages V1 and V2, it is expressed as follows from Equations (14) and (15).

$$\begin{aligned} V_R &= V1 - V2 \\ &= V_{IN} + R5\, I_{C(Q12)} + V_{BE(Q12)} - \\ &\quad R2\, I_{C(Q31)} - V_{BE(Q31)} \end{aligned} \tag{16}$$

As in Equation (7) of the first embodiment, a current $I_R$ flowing through the resistor R1 is $$I_R = V_R/R1. \tag{17}$$

If it is assumed the resistors R2–R5 that are connected to the emitters of the respective transistors Q31–Q33 and Q12 have the same resistance, the input-to-output current ratio of the current mirror circuit 302, which consists of the transistors Q31–Q33 and the resistors R2–R4 is 1:1 as in the case of the first embodiment of FIG. 2. Since the part of the circuit from the collector of the transistor Q32 to the output terminal $CM_{OUT}$ of the current mirror circuit 301 is the same as in the first embodiment, the collector current $I_{C(Q12)}$ of the transistor Q12 is expressed as $$I_{C(Q12)} = 2I_R - I_R = I_R. \tag{18}$$

On the other hand, if it is assumed that the common-emitter current amplification factor β of the transistor Q31 is sufficiently large, the collector current of the transistor Q31 is equal to the current flowing through the resistor R1, and hence is expressed as $$I_{C(Q31)} = I_R. \tag{19}$$

Therefore, as in Equation (10), the following relationship holds:

$$V_{BE(Q12)} = V_{BE(Q31)} \tag{20}$$

Further, as described above, the resistances of the resistors R2–R5 satisfy the following relationship:

$$R2 = R3 = R4 = R5 \tag{21}$$

Therefore, substituting Equations (18)–(21) into Equation (16), we obtain $$V_R = V_{IN}. \tag{22}$$

Equation (22) is the same as Equation (11) of the first embodiment. Therefore, as in the case of the first embodiment, this embodiment allows an output current $I_O$ to flow through the current output terminal 104, the output current $I_O$ being represented by Equation (12), that is, being obtained by accurately converting the input voltage $V_{IN}$ (voltage-to-current conversion).

An output resistance $R_{O(CM)}$ of the current mirror circuit 302 as viewed from each of the transistors Q32 and Q33 is expressed as $$R_{O(CM)} = R_O(1 + g_m\, R2) \tag{23}$$

where $R_O$ is an output resistance of a transistor and $g_m$ is a transconductance of the transistor. Equation (23) indicates that the output resistance $R_{O(CM)}$ is increased by connecting the resistances R3 and R4 to the emitters of the respective transistors Q32 and Q33. Therefore, this embodiment is advantageous over the first and second embodiments in the increased output resistance of the current mirror circuit 302, resulting in the improved accuracy.

FOURTH EMBODIMENT

Figure 5:
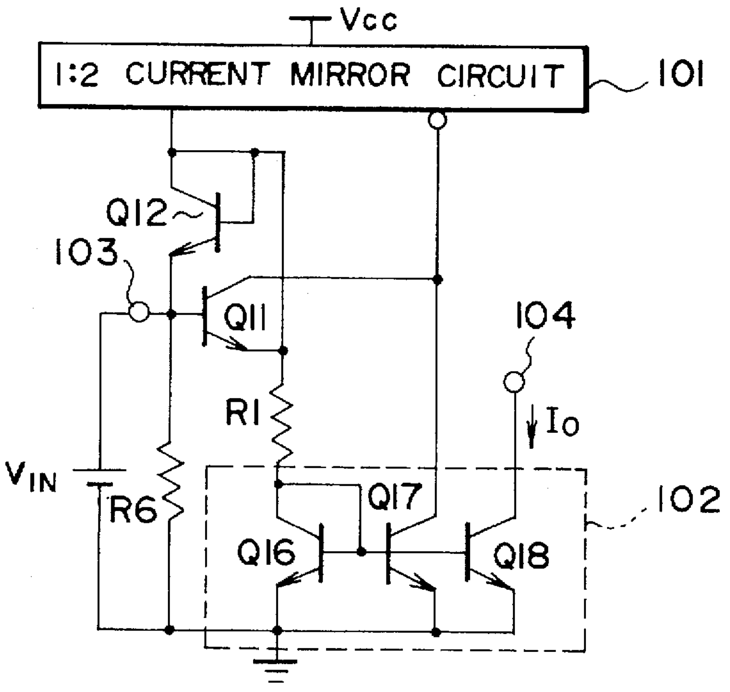
FIG. 5 is a circuit diagram showing a voltage-current conversion circuit according to a fourth embodiment of the invention.

As shown in FIG. 5, where the components that are the same as in FIG. 2 are given the same reference symbols and descriptions therefor will be omitted, this embodiment is composed of a resistor R6 which is inserted between the ground and the connecting point of the voltage input terminal 103, the emitter of the transistor Q12, and the base of the transistor Q11.

A current $I_{(R6)}$ flowing through the resistor R6 (whose resistance is R6) is $$I_{(R6)}=V_{IN}/R6. \qquad (24)$$

If the resistor R6 did not exist, a current $I_{VIN}$ flowing into the voltage input terminal 103 would be equal to the emitter current of the transistor Q12, i.e., $I_R$ (see Equation (8)). The current $I_R$ is also represented by Equation (7). Therefore, if this current $I_R$ flowing into the voltage input terminal 103 is equal to the current $I_{(R6)}$ that flows out by the insertion of the resistor R6, the current flowing through the voltage input terminal 103 when the resistor R6 is inserted becomes zero. That is, the insertion of the resistor R6 has an effect of reducing the load at the voltage input terminal 103. This is effective when the ability of driving the voltage input terminal 103 is weak.

As described above, the condition for making the current $I_{VIN}$ zero is $$I_{(R6)}=I_R. \qquad (25)$$

From Equations (7), (11) and (25), this condition is satisfied if $$R6=R1. \qquad (26)$$

FIFTH EMBODIMENT

Figure 6:
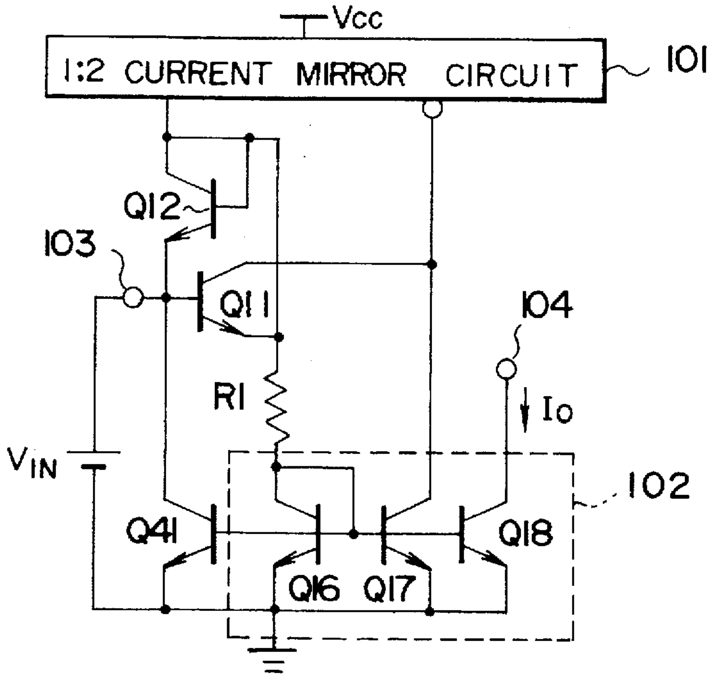
FIG. 6 is a circuit diagram showing a voltage-current conversion circuit according to a fifth embodiment of the invention.

As shown in FIG. 6, where the components that are the same as in FIG. 2 are given the same reference symbols and descriptions therefor will be omitted, this embodiment is composed of an NPN transistor Q41 whose collector is connected to the connecting point of the voltage input terminal 103, the emitter of the transistor Q12, and the base of the transistor Q11, emitter is grounded, and base is connected to the bases of the respective transistors Q16–Q18 that constitute the current mirror circuit 102.

Since the base and emitter of the transistor Q41 are connected to the base and emitter of the transistor Q16, respectively, a collector current of the transistor Q41 is equal to that of the transistor Q16. If the collector currents of the transistors Q41 and Q16 are respectively denoted by $I_{C(Q41)}$ and $I_{C(Q16)}$, $$I_{C(Q41)}=I_{C(Q16)}=I_R. \qquad (27)$$

Therefore, a current $I_{(VIN)}$ flowing through the voltage input terminal 1 is $$I_{(VIN)}=I_{C(Q12)}-I_{C(Q41)}=I_R-I_R=0. \qquad (28)$$

Thus, as in the case of the fourth embodiment of FIG. 5, this embodiment has the effect of reducing the load at the voltage input terminal 103.

Figure 4:
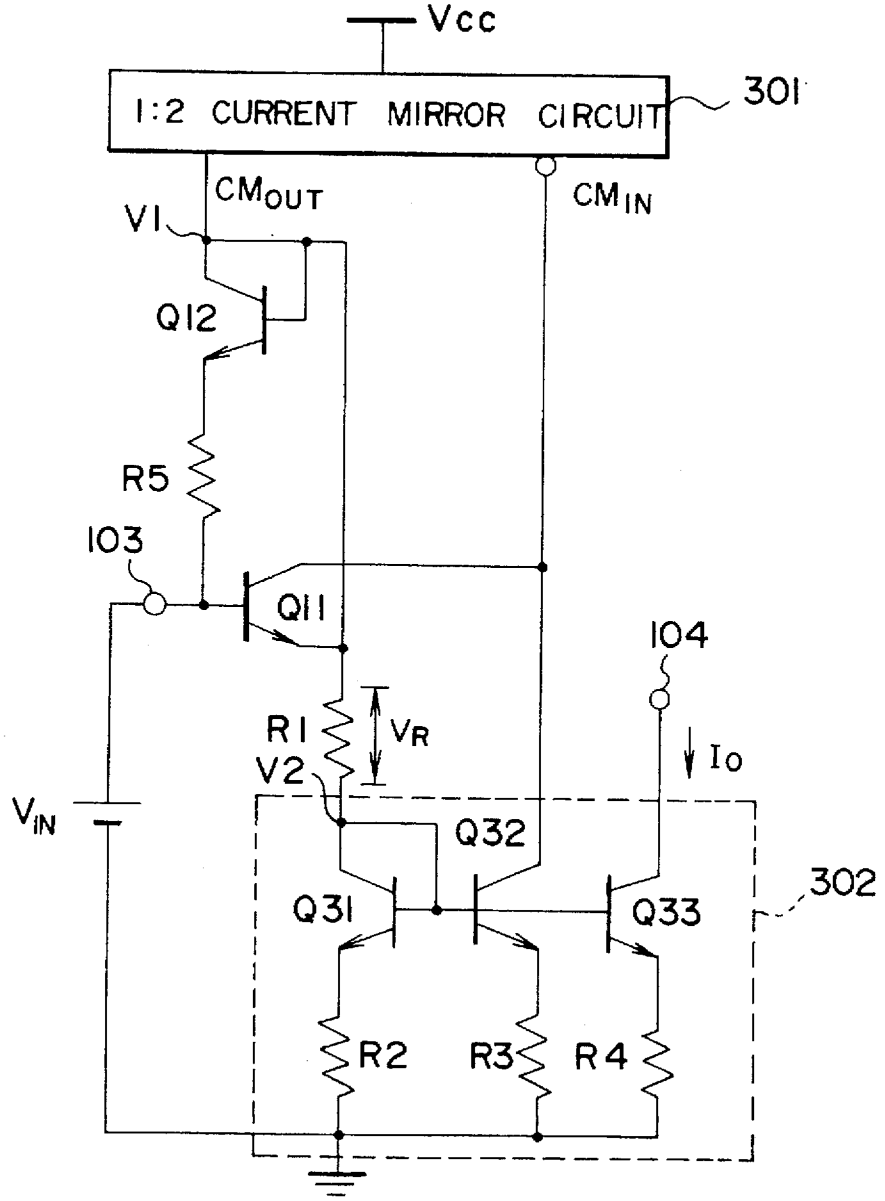
FIG. 4 is a circuit diagram showing a voltage-current conversion circuit according to a third embodiment of the invention.

The invention is not limited to the above-described embodiments. For example, the second embodiment of FIG. 3 may be modified such that the resistor R5 of FIG. 4 is inserted between the voltage input terminal 103 and the emitter of the transistor Q11 and the resistors R2–R4 of FIG. 4 are inserted between the ground and the emitters of the respective transistors Q21, Q22 and Q23 in the current mirror circuit 202. Although in FIGS. 5 and 6 the resistor R6 and the transistors Q41 are respectively added to the first embodiment of FIG. 2 in the same manner, they may be added to the second embodiment of FIG. 3.

What is claimed is:

1. A circuit for converting an input voltage to an output current, the input voltage being applied between an input terminal and a reference potential, the circuit comprising:

a first current mirror circuit for generating a first current according to a second current, the first current being proportional to the second current, the first current flowing through a first terminal, and the second current flowing through a second terminal;

a second current mirror circuit for generating the output current and the second current according to a third current, each of the output current and the second current being proportional to the third current, the second current flowing through a first output terminal, the output current flowing through a second output terminal;

a bipolar transistor which receives the first current from the first current mirror circuit at a connecting point, the connecting point connecting a collector to a base of the bipolar transistor and being connected to the first terminal of the first current mirror circuit, and an emitter of the bipolar transistor being connected to the input terminal which receives the input voltage; and a resistor through which the connecting point of the bipolar transistor is connected to the third terminal of the second current mirror circuit.

2. The circuit according to claim 1, wherein the bipolar transistor causes the first current to branch off the third current, the third current causing a voltage equal to the input voltage to be generated across the resistor.

3. The circuit according to claim 1, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

4. The circuit according to claim 1, wherein the second current mirror circuit comprises:

a first transistor whose base and collector are connected in common to the third terminal and emitter is connected to the reference potential;

a second transistor whose collector is connected to the first output terminal, base is connected to the base of the first transistor, and emitter is connected to the reference potential;

a third transistor whose collector is connected to the second output terminal, base is connected to the base of the first transistor, and emitter is connected to the reference potential.

5. The circuit according to claim 4, further comprising:

a first resistor through which the emitter of the bipolar transistor is connected to the input terminal;

a second resistor through which the emitter of the first transistor is connected to the reference potential, the second resistor having the same resistance as the first resistor;

a third resistor through which the emitter of the second transistor is connected to the reference potential, the third resistor having the same resistance as the first resistor; and a fourth resistor through which the emitter of the third transistor is connected to the reference potential, the third resistor having the same resistance as the first resistor.

6. The circuit according to claim 1, further comprising:

a first resistor through which the emitter of the bipolar transistor is connected to the reference potential.

7. The circuit according to claim 4, further comprising:

a fourth transistor whose collector is connected to the emitter of the bipolar transistor, base is connected to the base of the first transistor, and emitter is connected to the reference potential.

8. The circuit according to claim 5, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

9. The circuit according to claim 6, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

10. The circuit according to claim 7, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

11. A circuit for converting an input voltage to an output current, the input voltage being applied between an input terminal and a reference potential, the circuit comprising:

a first current mirror circuit for generating a first current according to a second current, the first current being two times larger than the second current, the first current flowing through a first terminal, and the second current flowing through a second terminal;

a second current mirror circuit for generating the output current and the second current according to a third current, each of the output current and the second current being equal to the third current, the second current flowing through a first output terminal, the output current flowing through a second output terminal;

a bipolar transistor which receives the first current from the first current mirror circuit at a connecting point, the connecting point connecting a collector to a base of the bipolar transistor and being connected to the first terminal of the first current mirror circuit, and an emitter of the bipolar transistor being connected to the input terminal which receives the input voltage; and a resistor through which the connecting point of the bipolar transistor is connected to the third terminal of the second current mirror circuit.

12. The circuit according to claim 11, wherein the bipolar transistor causes the first current to branch off the third current equal to the second current, the third current causing a voltage equal to the input voltage to be generated across the resistor.

13. The circuit according to claim 11, further comprising:

a start-up transistor for supplying the second terminal of the first current mirror circuit with an initial current, a base of the start-up transistor being connected to the input terminal a collector of the start-up transistor being connected to the second terminal of the first current mirror circuit, and an emitter of the start-up transistor being connected to the connecting point of the bipolar transistor.

14. The circuit according to claim 11, wherein the second current mirror circuit comprises:

a first transistor whose base and collector are connected in common to the third terminal and emitter is connected to the reference potential;

a second transistor whose collector is connected to the first output terminal, base is connected to the base of the first transistor, and emitter is connected to the reference potential;

a third transistor whose collector is connected to the second output terminal, base is connected to the base of the first transistor, and emitter is connected to the reference potential.

15. The circuit according to claim 14, further comprising:

a first resistor through which the emitter of the bipolar transistor is connected to the input terminal;

a second resistor through which the emitter of the first transistor is connected to the reference potential, the second resistor having the same resistance as the first resistor;

a third resistor through which the emitter of the second transistor is connected to the reference potential, the third resistor having the same resistance as the first resistor; and a fourth resistor through which the emitter of the third transistor is connected to the reference potential, the third resistor having the same resistance as the first resistor.

16. The circuit according to claim 11, further comprising:

a first resistor through which the emitter of the bipolar transistor is connected to the reference potential.

17. The circuit according to claim 14, further comprising:

a fourth transistor whose collector is connected to the emitter of the bipolar transistor, base is connected to the base of the first transistor, and emitter is connected to the reference potential.

18. The circuit according to claim 15, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

19. The circuit according to claim 16, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

20. The circuit according to claim 17, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

21. A circuit for converting an input voltage to an output current, the input voltage being applied between an input terminal and a reference potential, the circuit comprising:

a first current mirror circuit for generating a first current according to a second current, the first current being equal to the second current, the first current flowing through a first terminal, and the second current flowing through a second terminal;

a second current mirror circuit for generating the output current and the second current according to a third current, the output current being equal to the third current, the second current being two times larger than the third current, the second current flowing through a first output terminal, the output current flowing through a second output terminal;

a bipolar transistor which receives the first current from the first current mirror circuit at a connecting point, the connecting point connecting a collector to a base of the bipolar transistor and being connected to the first terminal of the first current mirror circuit, and an emitter of the bipolar transistor being connected to the input terminal which receives the input voltage; and a resistor through which the connecting point of the bipolar transistor is connected to the third terminal of the second current mirror circuit.

22. The circuit according to claim 21, wherein the bipolar transistor causes the first current to branch off the third current, the third current causing a voltage equal to the input voltage to be generated across the resistor.

23. The circuit according to claim 21, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

24. The circuit according to claim 21, wherein the second current mirror circuit comprises:

a first transistor whose base and collector are connected in common to the third terminal and emitter is connected to the reference potential;

a second transistor whose collector is connected to the first output terminal, base is connected to the base of the first transistor, and emitter is connected to the reference potential;

a third transistor whose collector is connected to the second output terminal, base is connected to the base of the first transistor, and emitter is connected to the reference potential.

25. The circuit according to claim 24, further comprising:

a first resistor through which the emitter of the bipolar transistor is connected to the input terminal;

a second resistor through which the emitter of the first transistor is connected to the reference potential, the second resistor having the same resistance as the first resistor;

a third resistor through which the emitter of the second transistor is connected to the reference potential, the third resistor having the same resistance as the first resistor; and a fourth resistor through which the emitter of the third transistor is connected to the reference potential, the third resistor having the same resistance as the first resistor.

26. The circuit according to claim 21, further comprising:

a first resistor through which the emitter of the bipolar transistor is connected to the reference potential.

27. The circuit according to claim 24, further comprising:

a fourth transistor whose collector is connected to the emitter of the bipolar transistor, base is connected to the base of the first transistor, and emitter is connected to the reference potential.

28. The circuit according to claim 25, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

29. The circuit according to claim 26, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

30. The circuit according to claim 27, further comprising:

a start-up transistor for supplying the second terminal of the first current mirror circuit with an initial current, a base of the start-up transistor being connected to the input terminal, a collector of the start-up transistor being connected to the second terminal of the first current mirror circuit, and an emitter of the start-up transistor being connected to the connecting point of the bipolar transistor.

* * * * *